United States Patent [19]

Behme et al.

[11] 4,145,487

[45] Mar. 20, 1979

[54] POLYURETHANE FOAMS CONTAINING REACTIVE FIBERS AND PROCESS FOR THEIR MANUFACTURE

[75] Inventors: Klaus J. Behme, Hofheim; Harald Cherdron, Naurod; Wolfgang Gordon, Hofheim; Hugo Burkhardt, Dreieichenhain, all of Fed. Rep. of Germany

[73] Assignee: Hoechst Aktiengesellschaft, Frankfurt am Main, Fed. Rep. of Germany

[21] Appl. No.: 676,614

[22] Filed: Apr. 13, 1976

[30] Foreign Application Priority Data

Feb. 19, 1976 [DE] Fed. Rep. of Germany ....... 2606562

[51] Int. Cl.² ............................................. C08G 18/14
[52] U.S. Cl. .................................... 521/117; 106/204; 521/137; 521/175
[58] Field of Search ................. 260/2.5 BE, 2.5 AM, 260/2.5 AS, 2.5 AK, 77.5 AM, 859 R, 17.4 ST, 17.4 SG; 521/137, 175, 117; 106/204

[56] References Cited

U.S. PATENT DOCUMENTS

| 2,763,624 | 9/1956 | Newell | 260/2.5 AK |
|---|---|---|---|
| 3,536,638 | 10/1970 | Dosmann | 260/2.5 BE |
| 3,558,531 | 1/1971 | Salyer et al. | 260/2.5 BE |
| 3,582,500 | 6/1971 | Carriere et al. | 260/2.5 AK |
| 3,600,289 | 8/1971 | Bragole | 260/859 R |
| 3,600,340 | 8/1971 | Patton et al. | 260/2.5 BE |
| 3,840,628 | 10/1974 | Stastny et al. | 260/2.5 BE |
| 3,931,066 | 1/1976 | Puig et al. | 260/2.5 AS |
| 4,014,826 | 3/1977 | Yunan | 260/2.5 BE |
| 4,061,701 | 12/1977 | Stastny et al. | 260/2.5 BE |

FOREIGN PATENT DOCUMENTS 1224482  9/1966  Fed. Rep. of Germany.

OTHER PUBLICATIONS

Saunders et al. — Polyurethanes: Chemistry & Technology (I. Chemistry) (Interscience) (N.Y.) (1962), pp. 264–265.

*Primary Examiner*—H.S. Cockeram
*Attorney, Agent, or Firm*—Curtis, Morris & Safford

[57] ABSTRACT

Fiber-containing polyurethane foams having improved compression properties, especially at deformations of greater than 50%, are obtained by incorporating in the foam-forming composition from 0.1 to 10% by weight, based on the weight of finished foam, of polyolefin fibers, e.g., polyethylene or polypropylene fibers, that have been treated to provide them with functional groups that are reactive with isocyanates. The reactive fibers may be obtained by fixing to the fiber surface or incorporating in the fiber polyfunctional compounds, e.g., starch, methylcellulose, carboxy methylcellulose, saccharin, polyglycols, polyvinyl alcohol, hydroxyl-group-containing block copolymers, completely saponified copolymers of ethylene and vinylacetate and oxidation products of a polyolefin.

4 Claims, No Drawings

POLYURETHANE FOAMS CONTAINING REACTIVE FIBERS AND PROCESS FOR THEIR MANUFACTURE

The present invention relates to fiber-containing polyurethane foams and a process for their manufacture.

It has been known for some time that powdery and fibrous fillers can be incorporated into polyurethane foams (see British Patent Specification No. 788,062). However, polyurethane foams containing powdery fillers are relatively rigid at low compression stress and thus unfit for the manufacture of upholstered furniture. This is also true for fibrous fillers of high stiffness which are used in polyurethane foams only for special applications, for example the manufacture of fireproof and bulletproof foams; glass fibers being proposed for these cases (see German Offenlegungsschrift No. 2,439,195).

The use of very finely ground wood cellulose as filler in polyurethane foams is described as being very advantageous (see German Auslegeschrift No. 1,224,482). A considerably large amount of from 5 to 60% by weight, relative to the reactive components, improves the elasticity properties. However, this large solids content causes great processing difficulties in industrial-scale equipment, so that this process cannot be utilized on a commercial scale. Furthermore, cellulose has the annoying property of swelling on contact with the water required as an expanding agent, so that the expanding agent is not uniformly distributed and control of the foam formation is handicapped. Furthermore, the thorough grinding of the wood cellulose, absolutely required before its incorporation, is an expensive further process step.

It has now been found that polyurethane foams containing polyolefin fibers have excellent properties. Simultaneously, there has been found a process for the manufacture of these foamed plastics.

The subject of the present invention is therefore fiber containing polyurethane foams, which contain from 0.1 to 10% by weight, relative to the finished foam, of polyolefin fibers containing groups reactive with isocyanates.

The subject of the present invention is furthermore a process for the manufacture of fiber-containing polyurethane foams, which comprises combining a polyhydroxyl component and a polyisocyanate component in the presence of from 0.1 to 10% by weight, relative to the finished foam, of polyolefin fibers containing groups reactive with isocyanates.

Nearly all known polyurethane foams are capable of containing polyolefin fibers. Advantageous are above all open-cell flexible and semi-rigid foams. It is practically irrelevant whether such foams are manufactured in blocks (block foam), or in heated or non-heated molds (hot or cold foam). The appropriate foams are manufactured in the presence of auxiliaries, from a polyhydroxyl component having a polyester or polyether structure and a polyisocyanate component having generally 2 or 3 isocyanate groups in the molecule. The polyhydroxyl component (hereinafter also called polyol) having a polyester structure is composed of one or more dicarboxylic acids and one or more compounds having from 2 to 4 hydroxyl groups, and/or of hydroxycarboxylic acids, for example condensation products of adipic acid and diethyleneglycol with or without trimethylol-propane, of adipic, phthalic acid, 1,3-butanediol and 1,2,6-hexane-triol, or of terephthalic acid, ethyleneglycol and glycerol. The polyhydroxyl components having a polyether structure are polyaddition products of epoxides or of tetrahydrofuran, the polyaddition of which is started generally with polyhydroxyl compounds such as water, ethyleneglycol, diethyleneglycol, 1,2-propyleneglycol, glycerol, trimethylolpropane, 1,2,6-hexanetriol, pentaerythritol, sorbitol, or with aliphatic or aromatic amines, generally in the presence of alkali; for example polyaddition products of ethylene oxide, 1,2-propylene oxide and glycerol, or of propylene oxide and propyleneglycol. Depending on the choice of the components, polyester and polyether polyols may be linear or branched. Suitable polyols are also natural or synthetic polymers containing hydroxyl groups.

Suitable polyisocyanates are above all aromatic isocyanate compounds, in many cases being substituted in o-position with respect to an isocyanate group, for example 4,4'-diisocyanato-diphenyl, 4,4'-diisocyanato-3,3'-dichloro-diphenyl, 4,4'-diisocyanato-3,3'-dimethoxy-diphenyl, 4,4'-diisocyanato-3,3'-dimethyl-diphenyl, 4,4'-diisocyanato-3,3'-diphenyl-diphenyl, 4,4-diisocyanato-diphenylmethane (MDI), 1,5-diisocyanato-naphthalene, diisocyanato-toluene (for example 80% of 2,4-diisocyanato- and 20% of 2,6-diisocyanato-toluene = TDI), 2,4,4'-triisocyanato-diphenyl ether or 4,4',4''-triisocyanato-triphenylmethane, which may be used per se or as blends.

As auxiliaries for the polyurethane manufacture, there are used expanding agents such as water and/or fluorinated hydrocarbons and as catalysts, for example triethylamine, N-methylmorpholine, 2,2-bis-dimethylamino-diethyl ether, dimethylbenzylamine, diethylene triamine, triethanolamine and/or tin(II)-octoate, foam stabilizers, for example polysiloxane compounds, and additives, for example flameproofing agents, pigments, etc.

The polyolefin fibers are composed of from 90 to 99.9% by weight, preferably from 95 to 99.8% by weight, especially from 97 to 99.5% by weight of a polyolefin, and of from 0.1 to 10% by weight of a polyfunctional, reactive component for isocyanates. By polyolefins, there are to be understood homo- and copolymers of ethylene, propylene, butene-(1), isobutene, styrene or α-methylstyrene. The polymers of ethylene comprise those having a density of from 0.91 to 0.97 g/cm$^3$, which is adjusted in the course of the manufacturing process and by means of comonomers, for example propylene, butene-(1) or hexene-(1). The polymers of propylene comprise for example homopolymers containing from 0.1 to a maximum of 25% of atactic components, statistical copolymers having up to 5% by weight of ethylene or butene-(1), and sequenced polymers having up to 25% by weight of ethylene. The polymers of styrene comprise atactic and isotactic homopolymers and statistical copolymers having for example up to 20% by weight of α-methylstyrene or up to 30% by weight of acrylonitrile. By polyolefin fibers, there are to be understood also fibers made of mixtures of the above polymers. Preferably, fibers are used the polyolefin of which is a polymer of ethylene or propylene with a comonomer content of less than 5%. For foamed plastics of very large volume and for hot foams, polypropylene fibers are preferably used.

A polyfunctional reactive component for isocyanates is fixed to the surface of the fibers. Suitable polyfunctional reactive components are compounds which react with isocyanates and have at least two OH, >NH or -COOH groups; these groups optionally being present simultaneously in one compound. Preferred compounds are those having at least 2 OH groups which may be of low molecular weight or, especially, of high molecular weight. Examples of these compounds are starch, methylcellulose, carboxymethyl cellulose, saccharin, polyglycols, polyvinyl alcohol, hydroxyl group containing block copolymers or completely saponified copolymers of ethylene and vinyl acetate, or oxidation products of a polyolefin. Especially suitable are polyvinyl alcohols having a saponification degree of from 30 to 99.9% and a solution viscosity (4% in water at 20° C.) of from 4 to 90 centipoises.

The amount of the polyfunctional reactive component in the fiber is from 0.1 to 10% by weight, preferably from 0.2 to 5% by weight.

The reactive component for isocyanates may be fixed to the core of the polyolefin fiber by absorption, chemical processes or mechanical molecule entanglement. The strength of the fixation is important; the reactive component ought not to detach from the fiber to an extent exceeding 10% after a 24 hour dispersion of the fiber in water at 50° C. and a 1% concentration. The polyfunctional reactive component for isocyanates may be fixed more or less uniformly only on the surface, or be present as separate phase partially on the surface and partially in the interior of the fiber; a complete covering of the whole surface is not required. However, it is advantageous to have covered as much of the surface as possible with the polyfunctional reactive component.

The length of the polyolefin fibers is advantageously from 0.3 to 10 mm; fibers having a length of from 0.3 to 3 mm being preferred because they can be more easily incorporated. The fibers may have a uniform or irregular cross section and they need not be fibrillated, although fibrillation is preferred. Thus, the fiber cross sections may vary in a wide range of from 0.5 to 500 $\mu$m. Especially good results are obtained when fibers are used the specific surface of which is more than 1 $m^2/g$ according to the BET method.

The orientation degree of the fibers is of minor importance. Good results are also obtained for example when in the case of a polyethylene fiber more than 90% of the polyethylene is crystallized in the form of spherulites. By fibers, there are to be understood polymer structures the length to diameter ratio of which is greater than 5.

Various processes for the manufacture of polyolefin fibers are known; for example melt extrusion of polyolefins with polyvinyl alcohol, post-oxidation of the surfaces of polyolefin fibers or post absorption of polyfunctional reactive components on the polyolefin fibers obtained for example by passing a superheated polymer solution through a nozzle, or forcing through a nozzle a superheated emulsion of a polyolefin solution and an aqueous solution of the reactive component. The especially preferred fibers having a specific surface of more than 1 $m^2/g$ are generally obtained by forcing a superheated solvent-containing polymer solution through a nozzle.

The fibers are not applied in the form of a network, but they are uniformly distributed in the resulting foamed plastic. In order to achieve this, it is recommended to disperse the fibers first in the isocyanate reactive components of the foam mixture and then to carry out the foaming operations in known manner. Dispersion of the fibers in the isocyanate reactive components may be carried out either by means of machines known from the paper industry for dispersing cellulose fibers in water, for example dynapulpers, hydropulpers, hollanders, fluid mixers or refiners, or the fibers may be disentangled according to known mechanical or aerodynamic processes and subsequently stirred into the reactive component. In both cases, the fibers may be used in a form saturated with water. However, the amount of water entrained with the fibers must be taken into consideration when calculating the intended content of expanding agent, and this latter content should not be exceeded by the amount of entrained water. The use of such wet reactive polyolefin fibers avoids an expensive drying step in many manufacturing processes, but it extends the mixing time necessary for the uniform distribution of the entrained water. Therefore, it may be advantageous in certain cases to use the reactive polyolefin fibers in dry form.

Dispersion of the fibers has a twofold function: first, the fibers are uniformly distributed in the isocyanate reactive component, and second, fiber bundles possibly present are disintegrated to such an extent that in the fiber containing foam obtained there are no flaws which can be detected by mechanical test means. The uniform dispersion allows furthermore a trouble-free incorporation of the other foam components, for example diisocyanate, catalyst, expanding agent and auxiliaries, and thus ensures a uniform distribution of the fibers in the complete foam mixture.

The fiber amount used, depending on the length and the morphology of the fibers, may vary in a range of from 0.1 to 10%, relative to the finished foam, and it has to be adapted to each individual case. Generally, an amount of from 0.3 to 5%, relative to the finished foam, is employed. The upper limit for the fiber amount is set by the price and the increased viscosity of the suspension of fibers in the isocyanate reactive component, and the lower limit is determined by the advantages which can be attained.

Because of the polyreaction in the presence of the reactive polyolefin fibers, the foams obtained display an improved behavior on compression. In the range of more than 50% of compression, these foams absorb a higher compression stress than foams without polyolefin fibers or containing non-reactive polyolefin fibers, that is, without an isocyanate reactive component.

In contrast to foams provided with non-fibrous fillers, the foams of the invention maintain their soft feel, and at low pressure, they can be compressed as easily as foams without fillers.

It is of special advantage that this effect can be attained when using a small amount of fiber, so that mixing problems are avoided and the mixing heads usual in industry for the manufacture of the foams can be used. Many other reactive fibers, for example polyamide fibers, cause mixing or wetting troubles, since the known fiber types are too stiff and too long.

Another advantage of the invention resides in the fact that the polyolefin fibers used, In constrast to cellulose fibers, do not absorb the water used as an expanding agent and do not cause irregular distribution of the water. Thus, there is no risk of the unit weight being altered and the pore structure becoming inhomogeneous by swelling of the fibers. Furthermore, it has been observed that by incorporation of the reactive polyolefin fibers the stability of the reaction mixture in the foaming phase is improved and thus an easier handling of the mixture in this critical phase is ensured.

The following examples illustrate the invention, parts and percentages being by weight unless otherwise stated.

EXAMPLE 1

A vessel having a capacity of 250 l and provided with an agitator and an outlet valve connected via a duct to a nozzle ending in an expanding vessel, is charged with 9.6 kg of polyethylene (RSV 1.4 dl/g, MFI 5.58), 120 l of water, 290 g of polyvinyl alcohol (viscosity 4.6 to 6 centipoises, 4% in water at 20° C., saponification degree 98.5 to 100 mol %) and 120 l of hexane. Subsequently, the vessel is closed, the contents of the vessel are heated to 150° C. with agitation and maintained at this temperature for about 2½ hours, thus attaining a pressure of 12.3 kg/cm$^2$. After the polyethylene has dissolved and the contents of the vessel are converted to a dispersion, the outlet valve is opened and the dispersion is discharged into the expanding vessel in such a manner that a vacuum pump connected to this vessel can remove the liberated vapors by suction and maintain a pressure of about 200 mm Hg. The fibers obtained are made into a paste with water, treated seven times in a disk refiner and subsequently separated from the water by centrifugation. According to the BET method, the fibers have a specific surface of 8.2 m$^2$/g and a median statistical fiber length of 0.9 mm according to the TAPPI standard T 233 SU 64.

In a cylindrical vessel having a capacity of about 1.5 l, 100 parts of a glycol/propylene oxide/ethylene oxide addition compound having a molecular weight of about 3000, an OH number of 56 and about 60 mol % of primary OH groups (= polyol for the manufacture of preferably thermosetting molded articles), and 2.8 parts of water and 1.0 part of the above fibers which have been disentangled uniformly in a fluid mixer and dried at 70° C. in a vacuum drying cabinet and which consist of 97% of polyethylene and 3% of polyvinyl alcohol, are agitated for 2 minutes at 1400 rpm by means of a mixing disk having a diameter of 63 mm attached to an agitator. Subsequently, 1.0 part of a commercial foam regulator on the basis of polysiloxane, 0.1 part of N-methylmorpholine, 0.1 part of 2,3-bis-dimethylaminodiethyl ether and 0.12 part of tin(II)-octoate are added and mixed again for 15 seconds. Subsequently, 38 parts of TDI (commercial-grade mixture of 80% of toluylene-2,4-diisocyanate and 20% of toluylene-2,6-diisocyanate) are added, mixed intensely for 6 to 8 seconds, and the mixture is poured then into a paper mold previously prepared. After the foaming is complete, the foam is hardened for an hour at 70° C. in a stove. A fine and open-cell foam is obtained in this and all other examples and comparative examples, the unit weight and compression stress values of which foams, determined according to German Industrial Standard DIN 53 577, are listed in Table 1.

EXAMPLE 2

The mixture of polyol, water and fibers as indicated in Example 1 is prepared in the manner also indicated there. Subsequently, first 2 parts of triethanolamine (chemically pure), 5 parts of trichlorofluoromethane, 1 part of a commercial cell regulator, 0.2 part of triethylamine and 0.6 part of a 33% solution of triethylene diamine in dipropyleneglycol, and then 43 parts of TDI as indicated in Example 1 are added, intermixed by agitation and foamed. The properties of the foam obtained are listed in Table 1.

EXAMPLE 3

In this example, 100 parts of a glycerol/propylene oxide/ethylene oxide addition compound having a molecular weight of about 4800, an OH number of 35 and an amount of 70% of primary OH groups (= polyol for coldsetting foam articles) are used in combination with 2 parts of triethanolamine, 2.8 parts of water, 5 parts of trichlorofluoromethane, 1 part of a commercial foam stabilizer on the basis of polysiloxane, 0.2 part of triethylamine, 0.6 part of a 33% solution of dipropyleneglycol in triethylene diamine and 51 parts of a mixture of TDI and MDI (4,4-diphenylmethane-diisocyanate) in a 40:60 ratio. The fibers consist of 98.8% of polypropylene and 1.2% of polyvinyl alcohol, they have a specific surface of 6 m$^2$/g according to the BET method and a medium statistical fiber length of 1.2 mm according to the TAPPI standard T 233 SU 64, and they are manufactured and prepared in a manner analogous to that used in preparing the polyethylene fibers of Example 1. The foam is also manufactured as indicated in Example 1. The properties are listed in Table 1.

EXAMPLE 4

Example 3 is slightly altered in such a manner that a commercial polymer polyol (polyether polyol modified with acrylonitrile, OH number 28) is used as polyol, and 45 instead of 51 parts of the same TDI/MDI mixture are employed. The properties of the resulting foam are listed in Table 1.

EXAMPLE 5

In a vessel having a capacity of 60 l, about 40 kg (100 parts) of a glycerol/propylene oxide/ethylene oxide addition compound having a molecular weight of 3500, an OH number of 47 and an amount of 20% of primary hydroxyl groups (= polyol for block foams), 3.8 parts of water and 2 parts of the polyethylene fiber used in Example 1, but having a moisture content of 50%, are homogenized for 1 hour by means of screw-spindle pump driven circulation in a pump circulation duct. The pump is adjusted to a throughput of 20 kg/min. For foaming, the mixture is forwarded via the duct to an industrial-scale mixing chamber with agitator (performance about 30 kg/h). Simultaneously, 1 part of foam stabilizer on the basis of polysiloxane, 0.5 part of dimethyl-benzylamine, 0.6 part of triethylamine dissolved in dipropyleneglycol (33%), 0.25 part of tin(II)-octoate and 48 parts of TDI (all relative to 100 parts of polyol) in a constant mixing ratio are pumped by means of separate precision piston pumps from separate ducts into the mixing chamber, where the whole is intensely mixed at 2100 rpm by means of a pin agitator. The finished mixture leaves the mixing chamber through a bottom nozzle in an amount corresponding to that of the feed of the components. After having taken off and rejected first runnings, the mixture is introduced within about 8 seconds into a prepared block mold of 50 × 50 × 70 cm dimensions, where the reaction mixture foams and hardens. The properties of the foam are listed in Table 1.

COMPARATIVE EXAMPLES A to E

The Examples 1 to 5 are repeated under the same conditions as indicated, but without addition of fibers; the water content of the total formulation remaining also constant. The properties of the foams are listed in Table 2; the letters of the Comparative Examples corresponding to the numbers of the Examples (that is, A to 1, B to 2, C to 3 etc.)

COMPARATIVE EXAMPLE F

EXAMPLE 3 is repeated in such a manner that instead of the polyvinyl alcohol containing polypropylene fibers staple fibers having a length of 6 mm are used which consist of 100% polypropylene and which are not provided with a polyfunctional reactive component for isocyanates. The time for mixing the fibers with the polyol is 10 minutes instead of 2; the agitator in this case being adjusted to different heights in certain time intervals, in order to obtain a homogeneous intermixing. The properties of the resulting foam are listed in Table 2.

TABLE 1

| Properties of the polymethane foams of Examples 1 to 5 | | | | | |
|---|---|---|---|---|---|
| Example | 1 | 2 | 3 | 4 | 5 |
| Unit weight (core) kg/m$^3$ | 34 | 28 | 31 | 35 | 26 |
| Compression stress value kPa | | | | | |
| at 10% compression | 3.0 | 0.8 | 1.0 | 1.4 | 2.2 |
| at 25% " | 3.1 | 1.1 | 1.3 | 1.9 | 2.8 |
| at 40% " | 3.7 | 1.4 | 2.0 | 2.7 | 3.1 |
| at 65% " | 7.9 | 4.0 | 4.8 | 7.7 | 6.5 |

In accordance with the Systeme Internationale d'Unites, the symbol kPa is an abbreviation for kilopascals which are pressure units approximately equivalent to 0.15 pounds per square inch.

TABLE 2

| Properties of the foams of comparative Examples A to F | | | | | | |
|---|---|---|---|---|---|---|
| Comparative Example | A | B | C | D | E | F |
| Unit weight (core) kg/m$^3$ | 34 | 28 | 31 | 35 | 25 | 31 |
| Compression stress value kPa | | | | | | |
| at 10% compression | 2.8 | 0.7 | 0.8 | 1.3 | 2.1 | 0.8 |
| at 25% " | 2.9 | 1.0 | 1.1 | 1.8 | 2.6 | 1.2 |
| at 40% " | 3.5 | 1.3 | 1.3 | 2.3 | 2.9 | 1.4 |
| at 65% " | 6.5 | 3.3 | 3.2 | 5.6 | 5.4 | 3.5 |

What is claimed is:

1. Fiber containing poly-urethane foams, which contain from 0.1 to 10% by weight, relative to the finished foam, of polyolefin fibers having polyfunctional reactive components for isocyanates fixed to the surface or fixed to the core of said fibers, said components being compounds having at least two OH groups.

2. Fiber containing polyurethane foams as claimed in claim 1, wherein the polyolefin fibers consist of 90 to 99.9% by weight of a polyolefin and of 0.1 to 10% by weight of a polyfunctional reactive component for isocyanates.

3. Fiber containing polyurethane foams as claimed in claim 1, wherein the polyolefin fibers have a specific surface of more than 1 m$^2$/g and a mean fiber length of from 0.3 to 5 mm.

4. A process for the manufacture of fiber containing polyurethane foams, which comprises combining a polyhydroxyl component and a polyisocyanate component in the presence of from 0.1 to 10% by weight, relative to the finished foam, of polyolefin fibers having polyfunctional reactive components for isocyanates fixed to the surface or fixed to the core of said fibers, said components being compounds having at least two OH groups.

* * * * *